United States Patent
Lewis (10) Patent No.: US 9,463,707 B2
(45) Date of Patent: Oct. 11, 2016

(54) METHOD AND SYSTEM FOR ALIGNING A VEHICLE WITH A WIRELESS CHARGING ASSEMBLY

(71) Applicants: Hyundai America Technical Center, Inc., Superior Township, MI (US); Hyundai Motor Company, Seoul (KR); Kia Motors Corporation, Seoul (KR)

(72) Inventor: Allan Lewis, Windsor, CA (US)

(73) Assignees: Hyundai America Technical Center, Inc., Superior Township, MI (US); Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/562,442

(22) Filed: Dec. 5, 2014

(65) Prior Publication Data

US 2016/0159234 A1 Jun. 9, 2016

(51) Int. Cl.
*B60L 11/18* (2006.01)
*B60R 1/00* (2006.01)

(52) U.S. Cl.
CPC ........ *B60L 11/1835* (2013.01); *B60L 11/1829* (2013.01); *B60L 11/1833* (2013.01); *B60R 1/00* (2013.01); *B60R 2300/205* (2013.01); *B60R 2300/80* (2013.01)

(58) Field of Classification Search
CPC ............ B60L 11/1835; B60L 11/1829; B60L 11/1833; B60R 2001/1215; B60R 2001/1223
See application file for complete search history.

(56) References Cited

U.S. PATENT DOCUMENTS

| | | | | |
|---|---|---|---|---|
| 6,326,886 B1* | 12/2001 | Hoffsommer | ........... | G01S 15/10 180/169 |
| 8,702,250 B2* | 4/2014 | Raz | .......................... | B60R 1/07 359/843 |
| 2007/0103281 A1* | 5/2007 | Li | .......................... | B60T 13/24 340/435 |
| 2013/0037339 A1 | 2/2013 | Hickox | | |
| 2013/0325264 A1* | 12/2013 | Alcazar | ................. | B62D 1/181 701/49 |
| 2014/0015328 A1* | 1/2014 | Beaver | ................. | B60L 11/182 307/104 |
| 2014/0132208 A1 | 5/2014 | Fisher | | |

FOREIGN PATENT DOCUMENTS

| | | |
|---|---|---|
| JP | H10176928 A | 6/1998 |
| JP | 2005-112298 A | 4/2005 |
| JP | 2010-226945 A | 10/2010 |
| JP | 2011-160515 A | 8/2011 |
| JP | 2013-046482 A | 3/2013 |
| KR | 101062989 | 6/2011 |
| KR | 10-2013-0024066 | 3/2013 |

\* cited by examiner

*Primary Examiner* — Rodney Butler
*Assistant Examiner* — Frederick Brushaber
(74) *Attorney, Agent, or Firm* — Mintz Levin Cohn Ferris Glovsky and Popeo, P.C.; Peter F. Corless (57) ABSTRACT

A method includes: estimating a position of a driver's eyes in a vehicle during a parking event in a parking spot that includes a wireless charging assembly in which a primary coil is installed, projecting an image onto an interior surface of the vehicle at a location based on the estimated position of the driver's eyes to assist the driver in aligning the vehicle with the wireless charging assembly, transmitting signals from the vehicle toward a reference object located at a rear area of the parking spot and detecting echoed signals at the vehicle caused by the transmitted signals reflecting from a surface of the reference object, and listening for an alignment confirmation signal at the vehicle from the wireless charging assembly indicating that the vehicle is satisfactorily aligned with the wireless charging assembly.

18 Claims, 7 Drawing Sheets

METHOD AND SYSTEM FOR ALIGNING A VEHICLE WITH A WIRELESS CHARGING ASSEMBLY

BACKGROUND (a) Technical Field

The present disclosure relates generally to wirelessly charging electric or hybrid electric vehicles, and more particularly, to aligning a vehicle with a wireless charging assembly.

(b) Background Art

Recently, technology relating to electric vehicles (EVs) and hybrid electric vehicles (IIEVs) has been rapidly developing. EVs and IIEVs are powered, at least in part, by electricity, and these vehicles often collect and store electricity, or in other words, are charged, from off-vehicle sources. As such, various methods of charging EVs and IIEVs have been explored. In particular, techniques for wireless charging, or inductive charging, have been the subject of considerable research.

Wireless charging, as opposed to wired charging, improves durability and longevity of the charging components by limiting contact and exposure of the components, increases safety by concealing potentially dangerous wires and connection interfaces, and enhances versatility by allowing charging stations to be implemented in a variety of ways (e.g., as a portable charging pad, embedded in a parking lot or road, etc.). To this end, wireless charging relies on an electromagnetic field to transfer energy between a charging station (e.g., wireless charging assembly) and an electrical device, such as a smart phone, a laptop, or an electric vehicle, as in the present case. Energy is sent through an inductive coupling formed between the wireless charging assembly and the device. Typically, an induction coil in the wireless charging assembly (e.g., primary coil) uses electricity, often provided from the power grid, to create an alternating electromagnetic field. An induction coil in the electrical device (e.g., secondary coil) may then receive power from the generated electromagnetic field and convert it back into electrical current to charge its battery. As a result, the primary and secondary induction coils combine to form an electrical transformer, whereby energy can be transferred between the two coils through electromagnetic induction.

Notably, a key element of successful wireless energy transfer typically requires that the wireless charging assembly and the electrical device be located within reasonable proximity to one another. That is, with respect to the present case, the secondary coil installed in the EV or HEV must be satisfactorily aligned with the primary coil of the wireless charger assembly, in order for the vehicle to be effectively charged. Though recent methods, such as resonant inductive coupling, allow for the charging assembly and electrical device to be spaced further from each other, energy transfer efficiency can suffer when using such techniques. Generally speaking, as the primary and secondary coils are spaced further apart, energy loss increases and charge efficiency decreases.

Currently, proper alignment of the receiving coils installed in an EV or HEV with a wireless charging assembly can be aided through the use of radio-frequency identification (RFID) technology. However, such technology can be too expensive for widespread use. Moreover, less costly techniques, such as magnetic pings sent from the wireless charger, can aid proper alignment, but these techniques can be ineffective.

SUMMARY OF THE DISCLOSURE

The present disclosure provides techniques for guiding a driver of an EV or HEV into a parking spot where a wireless charging assembly is located, so the vehicle's induction coils can couple with the charging assembly. The disclosed techniques effectively align the induction coils of the EV or HEV with the coils of the charging assembly in a cost-effective manner.

According to embodiments of the present disclosure, a method includes: estimating a position of a driver's eyes in a vehicle during a parking event in a parking spot that includes a wireless charging assembly in which a primary coil is installed; projecting an image onto an interior surface of the vehicle at a location based on the estimated position of the driver's eyes to assist the driver in aligning the vehicle with the wireless charging assembly; transmitting signals from the vehicle toward a reference object located at a rear area of the parking spot and detecting echoed signals at the vehicle caused by the transmitted signals reflecting from a surface of the reference object; performing one or more calculations based on the detected echoed signals to determine an alignment state of the vehicle with respect to the wireless charging assembly; and listening for an alignment confirmation signal at the vehicle from the wireless charging assembly indicating that the vehicle is satisfactorily aligned with the wireless charging assembly.

The performing of the one or more calculations based on the detected echoed signals may include: calculating one or more of an amplitude of the detected echoed signals and a voltage caused by the detected echoed signals.

The method may further include: comparing the calculated amplitude to an amplitude of an echo without an angular offset with respect to the transmitted signals, or comparing the calculated voltage to a voltage caused by the echo without an angular offset; and determining whether the difference between the calculated amplitude and the amplitude of the echo without an angular offset or the difference between the calculated voltage and the voltage caused by the echo without an angular offset is within a predetermined range.

The alignment state of the vehicle may relate to an angle of a longitudinal axis of the vehicle with respect to a surface of the reference object.

The method may further include: providing feedback to the driver indicating the alignment state of the vehicle.

The feedback to the driver may include one or more of a sound and a visual indicator.

The method may further include: projecting the image onto a windshield of the vehicle, so as to be located within a field of vision of the driver.

The projected image may be configured to be visually compatible with the reference object.

The projected image may be configured to be directionally aligned with the estimated position of the driver's eyes and a target disposed on the reference object.

The method may further include: determining an angle of one or more minors of the vehicle; and estimating the position of the driver's eyes based on the determined angle of the one or more minors.

The one or more minors includes a side minor of the vehicle.

The method may further include: receiving the alignment confirmation signal at the vehicle from the wireless charging assembly.

The method may further include: utilizing a wireless communication channel of the vehicle in response to the received alignment confirmation signal.

The method may further include: wirelessly receiving a charge at the vehicle from the wireless charging assembly after receiving the alignment confirmation signal.

The alignment confirmation signal may include a magnetic ping transmitted by the wireless charging assembly.

The method may further include: transmitting the signals from an ultrasonic sensor in the vehicle, wherein the signals are ultrasonic signals.

The vehicle may be an electric vehicle or a hybrid electric vehicle in which a secondary coil is installed, the secondary coil being capable of receiving a wireless charge from the primary coil of the wireless charging assembly.

The reference object may be a sign, and the surface of the reference object may face a front area of the parking spot.

Furthermore, according to embodiments of the present disclosure, a system includes: a reference object located at a rear area of a parking spot; a heads-up display (HUD) in a vehicle that projects an image onto an interior surface of the vehicle at a location based on an estimated position of a driver's eyes to assist the driver in aligning the vehicle with a wireless charging assembly, in which a primary coil is installed, included in the parking spot during a parking event; an ultrasonic sensor in the vehicle that transmits ultrasonic signals toward the reference object and detects echoed signals at the vehicle caused by the transmitted signals reflecting from a surface of the reference object; and a controller in the vehicle configured to: i) estimate the position of the driver's eyes based on an angle of one or more mirrors of the vehicle, ii) perform one or more calculations based on the detected echoed signals to determine an alignment state of the vehicle with respect to the wireless charging assembly, and iii) detect an alignment confirmation signal from the wireless charging assembly indicating that the vehicle is satisfactorily aligned with the wireless charging assembly.

Furthermore, according to embodiments of the present disclosure, a non-transitory computer readable medium containing program instructions for a system, which includes a reference object located at a rear area of a parking spot, a heads-up display (HUD) in a vehicle that projects an image onto an interior surface of the vehicle at a location based on an estimated position of a driver's eyes to assist the driver in aligning the vehicle with a wireless charging assembly, in which a primary coil is installed, included in the parking spot during a parking event, and an ultrasonic sensor in the vehicle that transmits ultrasonic signals toward the reference object and detects echoed signals at the vehicle caused by the transmitted signals reflecting from a surface of the reference object, includes: program instructions that estimate the position of the driver's eyes based on an angle of one or more mirrors of the vehicle; program instructions that perform one or more calculations based on the detected echoed signals to determine an alignment state of the vehicle with respect to the wireless charging assembly; and program instructions that detect an alignment confirmation signal from the wireless charging assembly indicating that the vehicle is satisfactorily aligned with the wireless charging assembly.

BRIEF DESCRIPTION OF THE DRAWINGS

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Wireless charging, wirelessly transferring power, or the like, may refer to transferring any form of energy associated with electric fields, magnetic fields, electromagnetic fields, or otherwise from a transmitter to a receiver without the use of physical electrical conductors (e.g., power may be transferred through free space). The power output from a first (e.g., "primary") coil into a wireless field (e.g., a magnetic field) may be received or captured by a second (e.g., "secondary" or "receiving") coil to achieve power transfer.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the control unit, whereby the apparatus is known in the art to be suitable for assisting in aligning a vehicle with a wireless charging assembly.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to embodiments of the present disclosure, the disclosed techniques utilize a low-cost combination of physics and geometry to align a vehicle with a wireless charging system (e.g., wireless charging assembly). In particular, a position of a driver's eyes in a vehicle may be estimated during a parking event. The parking event may include parking in a parking spot that includes a wireless charging assembly, in which a primary coil is installed. Further, an image may be projected onto an interior surface of the vehicle at a location based on the estimated position of the driver's eyes. The projected image can assist the driver in aligning the vehicle with the wireless charging assembly in the parking spot. Further, signals may be transmitted from the vehicle toward a reference object located at a rear area of the parking spot, and echoed signals caused by the transmitted signals reflecting from a surface of the reference object may be detected at the vehicle. Upon detection of the echoed signals, calculations based on the echoed signals may be performed in order to determine an alignment state of the vehicle with respect to the wireless charging assembly. Meanwhile, an alignment confirmation signal from the wireless charging assembly may be listened for at the vehicle, where the alignment confirmation signal indicates that the vehicle is satisfactorily aligned with the wireless charging assembly.

Figure 1:
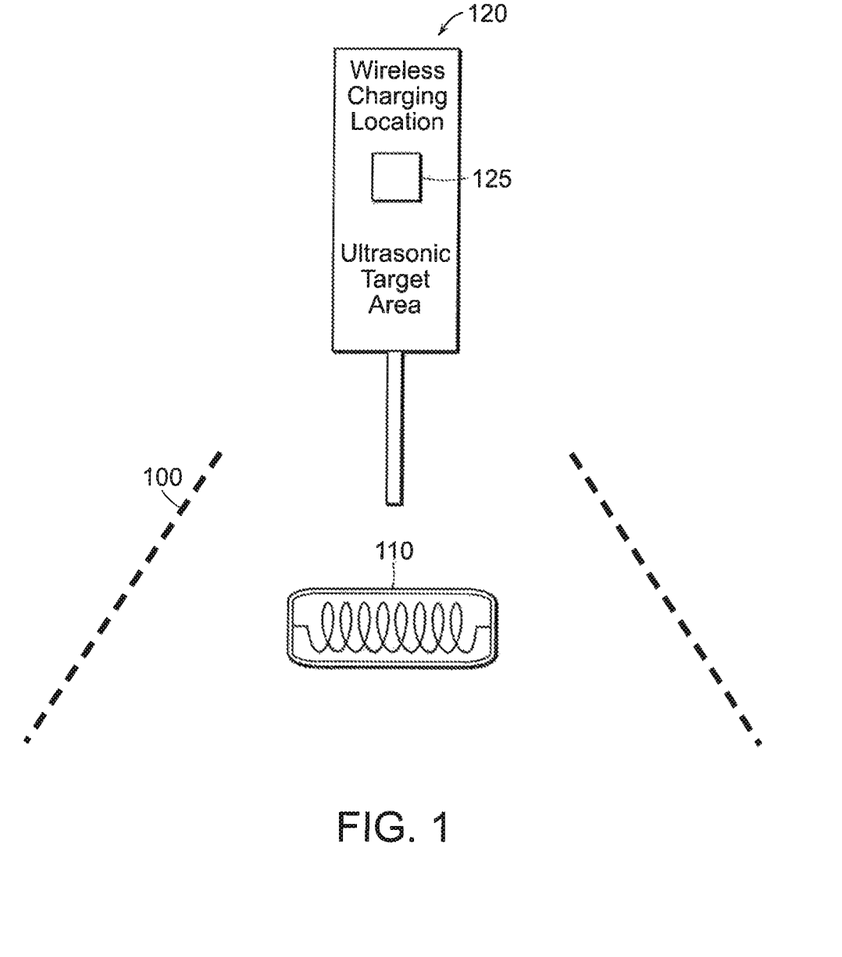
FIG. 1 illustrates an example schematic depiction of a reference object.

FIG. 1 illustrates an example schematic depiction of a reference object. As shown in FIG. 1, a parking spot 100 includes a wireless charging assembly 110. The parking spot 100 may represent any area in which a vehicle may be parked, such as, for example, a parking spot in a parking lot, a garage, and so forth. The wireless charging assembly 110 may embody induction coils (e.g., primary coils) that use electricity in order to create an electromagnetic field and, ultimately, wirelessly charge a nearby vehicle. The wireless charging assembly 110 may be connected to and receive electric current from a local distribution center (e.g., power grid), or any other suitable energy source. The wireless charging assembly 110 may be positioned in the parking spot 100 and implemented in any suitable manner, such as, for example, in a portable charging pad, embedded in or under the ground on which the vehicle. In particular, the wireless charging assembly 110 may be positioned and implemented such that a vehicle (e.g., EV or HEV) can be driven and/or parked sufficiently proximate to the wireless charging assembly 110, such that the vehicle may wirelessly receive electricity transferred from the charging assembly 110.

For example, the wireless charging assembly 110 may be embodied as a portable charging pad connected to a local power distribution center, whereby a vehicle can be driven and/or parked over the charging pad. As another example, the wireless charging assembly 110 may be embedded in the ground (e.g., partially underground or entirely underground) and connected to the local power distribution center, whereby a vehicle can be driven and/or parked over the area of ground in which the wireless charging assembly 110 is embedded. In both cases, or any other suitable case, the vehicle is capable of being driven and/or parked sufficiently proximate to the wireless charging assembly 110, such that the secondary (i.e., receiving) coils installed in the vehicle are capable of being aligned with the primary coils of the charging assembly 110.

A reference object 120 may be positioned at or around a rear area of the parking spot 100. That is, the reference object 120 may be positioned such that a front surface thereof substantially faces a front area of the parking spot 100 and the vehicle as it enters the parking spot 100. The reference object 120 may be a sign-like object, as depicted in FIG. 1, having a front and rear surface. Alternatively, the reference object 120 may be a wall, a post, or any other object having a surface that substantially faces the vehicle as it enters the parking spot 100. As described in further detail below, the reference object 120 may represent a target area for signals (e.g., ultrasonic signals) transmitted from the vehicle, in order to determine an alignment state of the vehicle with respect to the wireless charging assembly 110.

The reference object 120 may be placed so as to indicate the position of the wireless charging assembly 110 to the driver. To this end, a target 125 may be disposed (e.g., painted, printed, etc.) on the reference object 120 and provided as a geometric alignment target area for the driver. The target 125 may have a shape in accordance with the vehicle geometry and wireless charging assembly tolerance (e.g., rectangular). As described in further detail below, the driver may steer the vehicle while entering the parking spot 100 so as to align an image projected onto an interior surface of the vehicle with the target 125, thereby aligning the vehicle with the wireless charging assembly 110.

Figure 2:
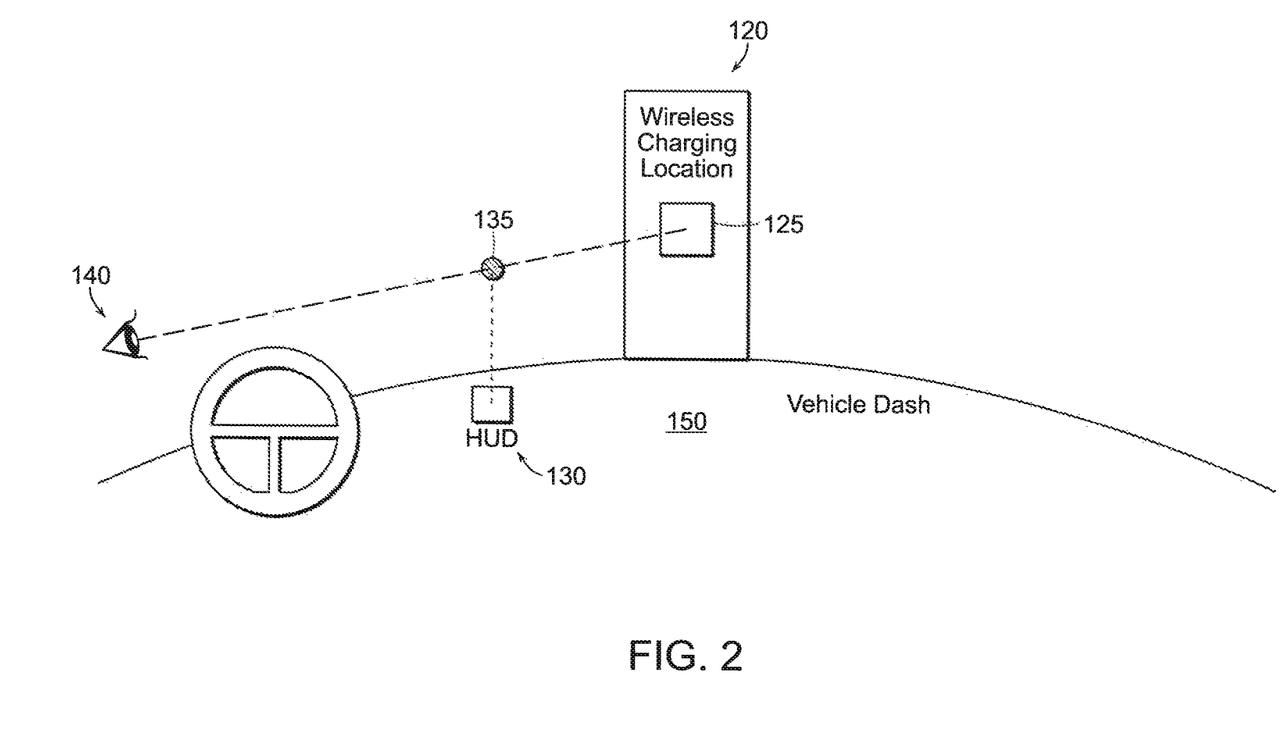
FIG. 2 illustrates an example schematic depiction of a primary alignment methodology.

FIG. 2 illustrates an example schematic depiction of a primary alignment methodology. As shown in FIG. 2, a driver can utilize the reference object 120 with the target 125 disposed thereon to align the vehicle visually in the parking spot 100 with respect to the wireless charging assembly 110. In this regard, a position of the driver's eyes 140 may be estimated using a variety of techniques. For example, an angle at which one or more mirrors in the vehicle (e.g., side mirror, rear-view mirror, etc.) have been set by the driver can be determined, and based on the angle of the one or more minors, the position of the driver's eyes 140 may be calculated. The one or more minors may be manually adjusted by the driver or automatically adjusted (e.g., using an automatic minor adjustment system) in order to assure consistent positioning of the minors.

Figure 8:
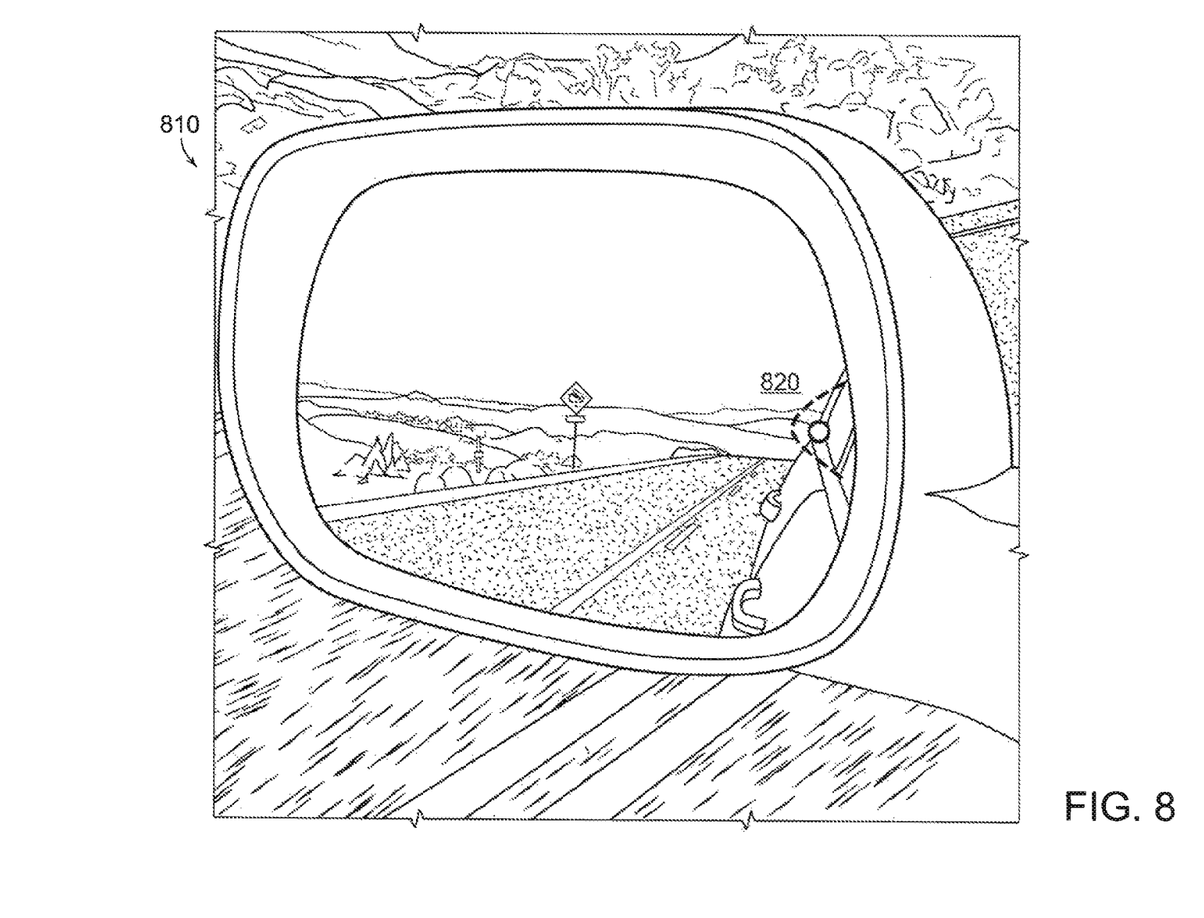
FIG. 8 illustrates an example depiction of an image-based mirror alignment methodology.

Additionally, as shown in FIG. 8, a minor 810 (e.g., side minor or rear-view minor) may be equipped with a marking 820 thereon to assist the driver in adjusting the mirror. The marking 820 may be illuminated or permanently displayed on the mirror 810. As a non-limiting example, the marking 820 may consist of a dashed line along an inside edge of one or both side minors 810. Further, in this example, a dot may be placed on the bottom, front-facing rear window case, such that the driver may adjust the side minors 810 so the dot appears within the dashed line (from the perspective of the driver), and the angle of the mirror 810 can be set in a consistent manner. As a result, the position of the driver's eyes 140 can be accurately estimated. It should be noted that this example, as illustrated in FIG. 8, is for demonstration purposes only and should not be treated as limiting the disclosure. Rather, other suitable mirror adjustment aids can be used.

As further shown in FIG. 2, a heads-up display (HUD) unit 130 can project an image 135 onto an interior surface of the vehicle during a parking event to assist the driver in aligning the vehicle with the wireless charging assembly. The HUD unit 130 may be a standard HUD unit, e.g., containing an array of light-emitting diodes (LEDs). The HUD unit 130 may be mounted on the dashboard 150 of the vehicle, for example. The HUD unit 130 may project the image 135 so as to be located within a field of vision of the driver (e.g., on the windshield). The image 135 may consist of any suitable marking, such as a dot, crosshair, and the like. The positioning of the projected image 135 can be determined based on the estimated position of the driver's eyes 140, which can be achieved using the above-referenced techniques. That is, the position at which the HUD unit 130 projects the image 135 may depend on the estimated position of the driver's eyes 140. For instance, if the position of the driver's eyes 140 is estimated to be closer to the center of the vehicle than usual, the image 135 may likewise be projected onto the windshield at a position closer to the center of the vehicle. Moreover, the positioning of the projected image 135 may be further affected by additional factors, such as, for example, a fixed location of the vehicle's induction coils (e.g., secondary coils) and a known dimensional offset from the driver's seat, as well as the position and dimensions of the reference object 120.

Operationally, the driver may maneuver the vehicle such that the projected image 135 optically aligns with the geometric target 125 on the reference object 120. This made possible because the projected image 135 is configured to be visually compatible with the reference object 120, and in particular, the target 125. That is, the projected image 135 is configured to be directionally aligned with the estimated position of the driver's eyes 140 and the target 125 disposed on the reference object 120. Therefore, when entering the parking spot 100, the driver may control the vehicle such that the image 135 appears (from the driver's perspective) within the target 125.

Notably, FIG. 2 demonstrates a primary alignment methodology in which the driver is assisted in optically aligning the vehicle with the wireless charging assembly 110. However, the optical alignment methodology alone may not necessarily ensure that the vehicle is not being driven and/or parked at an angle with respect to the parking spot 100. Therefore, a secondary alignment methodology as demonstrated in FIG. 3, which utilizes signal transmissions, as described in further detail below, may be employed in conjunction with the primary (i.e., optical) alignment methodology.

Figure 3:
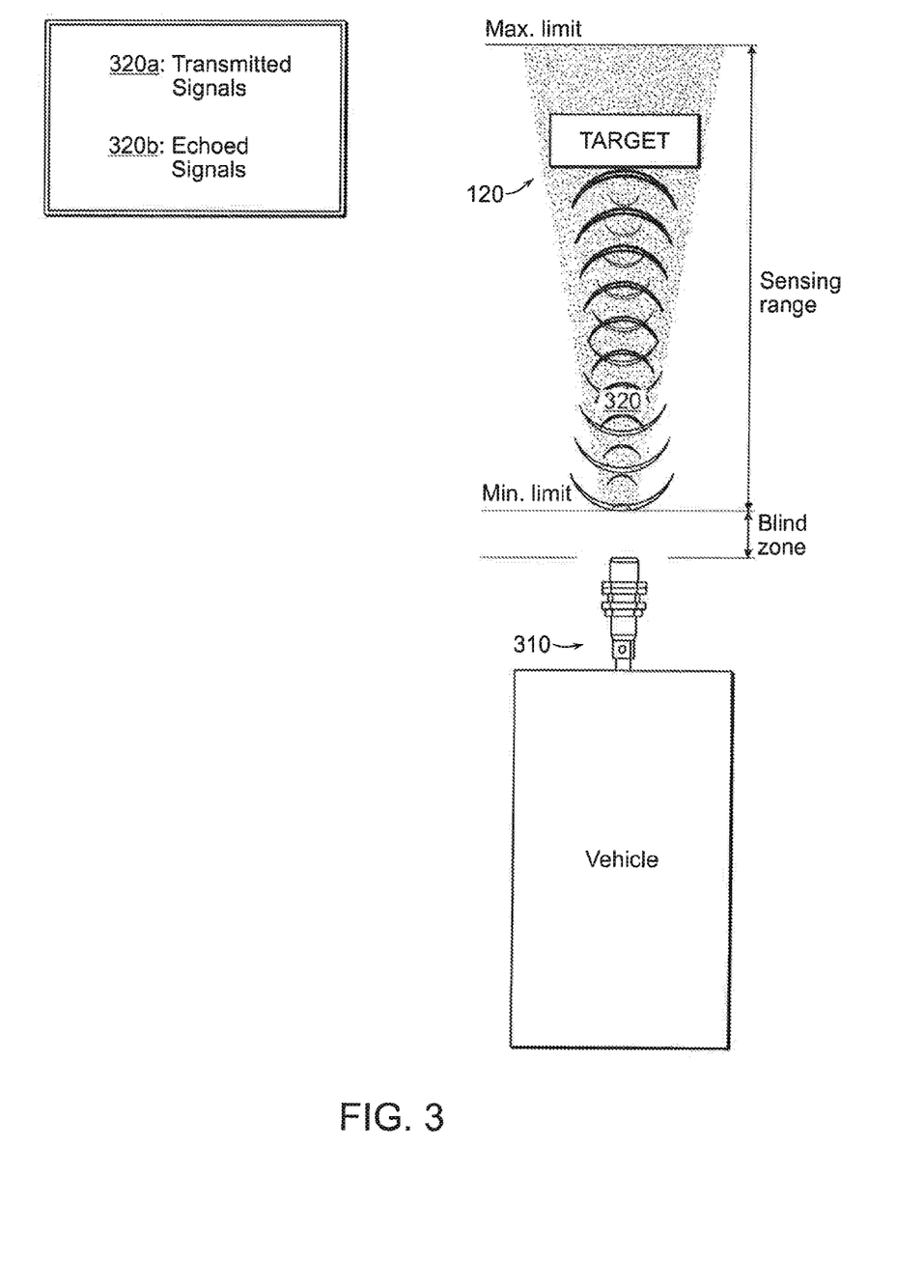
FIG. 3 illustrates an example schematic depiction of a secondary alignment methodology.
Figure 4:
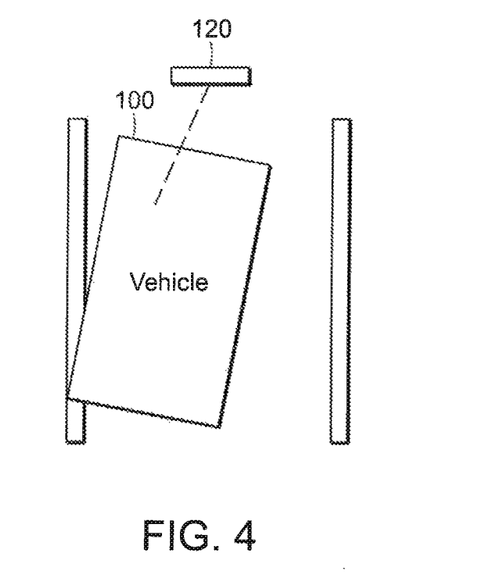
FIG. 4 illustrates an example schematic depiction of performing visual alignment.
Figure 5:
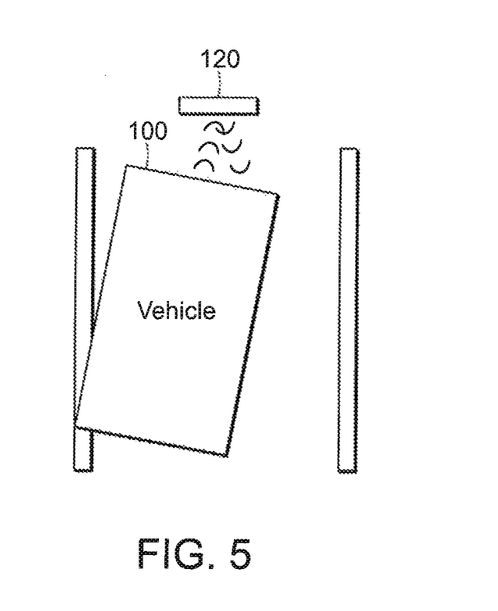
FIG. 5 illustrates an example schematic depiction of performing ultrasonic alignment.

In this regard, FIG. 4 illustrates an example schematic depiction of performing visual alignment (i.e., primary alignment methodology), while FIG. 5 illustrates an example schematic depiction of performing ultrasonic alignment (i.e., secondary alignment methodology). As shown in FIG. 4, the driver's line of vision is directed from the vehicle toward the reference object 120, and the optical alignment techniques described above may be employed. Meanwhile, as shown in FIG. 5, the vehicle may transmit signals toward the reference object 120 and detect echoed signals resulting from the transmitted signals reflecting from a surface of the reference object 120. One or more calculations may be performed based on the detected echoed signals, in order to determine an alignment state of the vehicle with respect to the wireless charging assembly, as described in further detail below. Notably, the primary optical alignment methodology demonstrated in FIGS. 2 and 4 may be employed simultaneously with the secondary signal-based alignment methodology demonstrated in FIGS. 3 and 5, thereby providing a cost-effective solution for ensuring that the vehicle is correctly oriented within the parking spot 100 (i.e., the vehicle is straight) and properly aligned with the wireless charging assembly 110.

Referring now to FIG. 3, this figure illustrates an example schematic depiction of a secondary alignment methodology. As shown in FIG. 3, the vehicle may transmit signals 320a toward the reference object 120 and may detect echoed signals 320b caused by the transmitted signals reflecting from a surface of the reference object 120. The signals 320a and 320b may be transmitted and received, respectively, using a sensor device 310 (including a transducer) in the vehicle. For example, the sensor device 310 may be an ultrasonic sensor installed in a front portion of the vehicle, and accordingly, the signals 320 may be ultrasonic signals. However, for the purposes of the present disclosure, the sensor 310 is not limited to an ultrasonic sensor. Rather, any sensor device capable of being installed in a vehicle and suitable for transmitting signals toward the reference object 120 and for detecting echoed signals reflecting from a surface of the reference object 120 may be utilized.

One or more calculations may be performed based on the detected echoed signals 320b to determine an alignment state of the vehicle with respect to the wireless charging assembly 110. More specifically, performing one or more calculations based on the detected echoed signals 320b can determine various vehicle alignment indicators, including a presence of the reference object 120, a distance from the reference object 120 to the vehicle, an angle of the vehicle with respect to a surface of the reference object 120, and so forth.

To determine the above alignment indicators, an amplitude of the detected echoed signals 320b and/or a voltage caused by the detected echoed signals 320b can be calculated. Further, the amplitude and/or voltage of a hypothetical echo parallel to the acoustic axis of the sensor 310 (i.e., an echo with an angular offset of 0° with respect to the transmitted signals 320a) can be calculated and then compared to the previously calculated amplitude and/or voltage of the detected echoed signals 320b. If the difference between the calculated amplitude of the signals 320b and the amplitude of the echo with the angular offset of 0° or the difference between the calculated voltage and the voltage caused by the echo with the angular offset of 0° is within a predetermined range, it can be determined that the vehicle is properly oriented in the parking spot 100 and sufficiently aligned with the wireless charging assembly 110. Moreover, the distance from the vehicle to the reference object 120 can be calculated based on the detected echoed signals 320b, and it can be determined whether the distance is within a predetermined range.

As a working example, if the reference object 120 is located along the acoustic axis ($\theta=0°$) of the sensor device 310, an echo 320b will be produced that is not reduced in amplitude due to the transmitting beam pattern, and similarly, the voltage that the echo 320b will cause the receiving transducer (e.g., in the sensor device 310) to produce will not be diminished. In contrast, if the reference object 120 is offset by 15° with respect to the acoustic axis of the sensor device 310, the sound pulse from the sensor 310 will be reduced by 3 dB due to the beam pattern, which will cause the magnitude of the resulting echo 320b to be reduced by 3 dB. When the echo 320b reaches the receiver (e.g., in the sensor device 310), the resulting voltage produced will be reduced by another 3 dB in comparison to the voltage that the same magnitude of echo would have produced if it had been received along the acoustic axis of the sensor 310. Therefore, the 3 dB reduction in echo level, in addition to the 3 dB reduction in received sensitivity, result in a total reduction of 6 dB in the voltage produced by the echo 320b when the reference object 120 is offset by 15° with respect to the acoustic axis of the sensor device 310 (i.e., in contrast to the reference object 120 being located directly on the acoustic axis).

Furthermore, feedback may be provided to the driver indicating the alignment state of the vehicle, based on the detected echoed signals 320b. That is, as the driver maneuvers the vehicle in the parking spot 100 toward the wireless charging assembly 110 (e.g., in order to initiate a charging process), when the angle of a longitudinal axis of the vehicle with respect to a surface of the reference object 120 is satisfactory (e.g., the difference between the calculated amplitude and/or voltage of the echoed signals 320b and the amplitude and/or voltage of the hypothetical echo with the angular offset of 0° is within a predetermined range), the vehicle may provide feedback to the driver to inform the driver of the current alignment state. Conversely, provided feedback may inform the driver that the vehicle is not satisfactorily aligned. The feedback to the driver may include one or more of a sound, a visual indicator, and the like.

Figure 6:
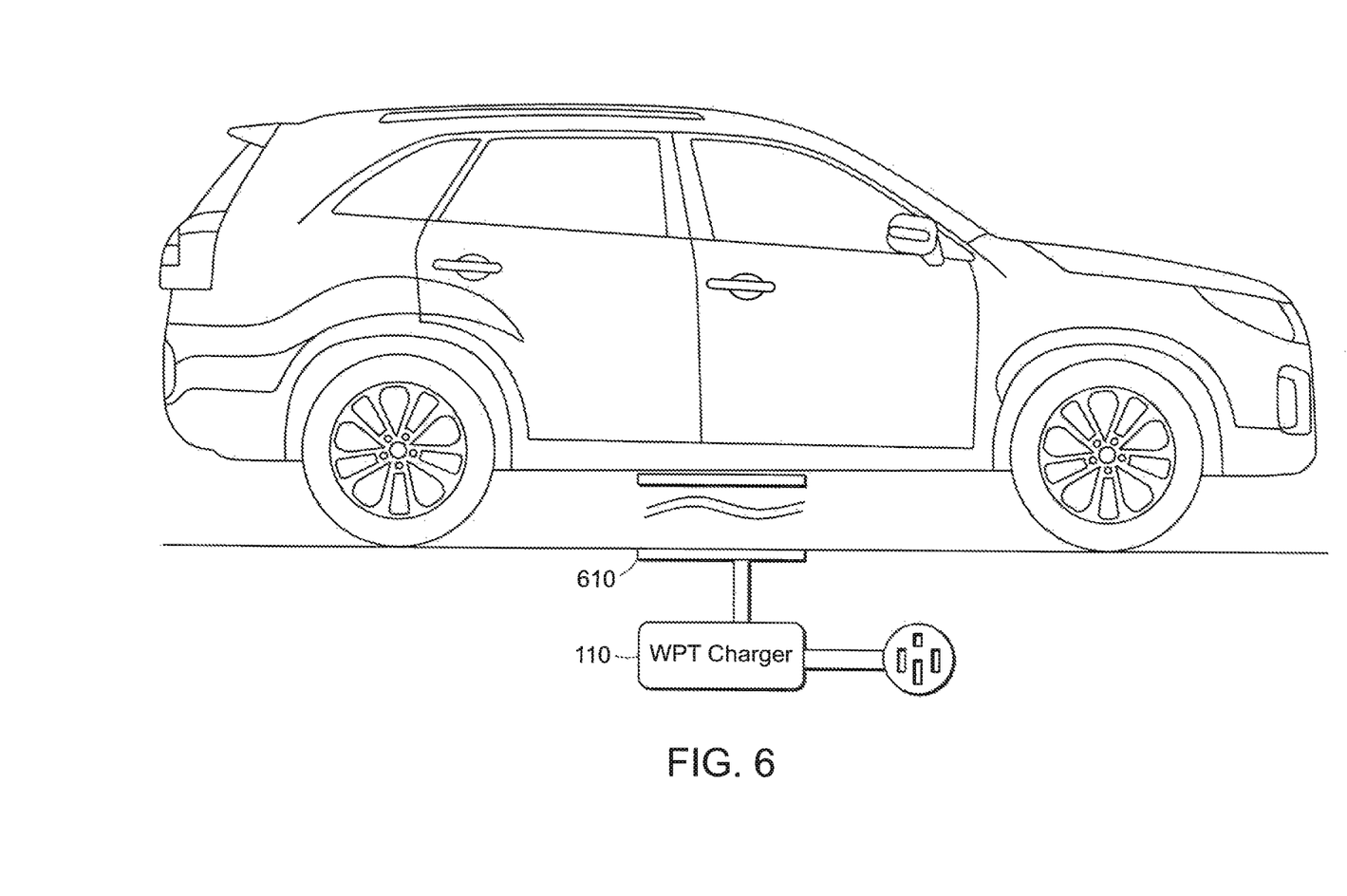
FIG. 6 illustrates an example schematic depiction of receiving an alignment confirmation signal.

FIG. 6 illustrates an example schematic depiction of receiving an alignment confirmation signal. As shown in FIG. 6, the secondary coils of the vehicle are satisfactorily aligned with the primary coils of the wireless charging assembly 110, and thus, an inductive coupling 610 is formed between the wireless charging assembly 110 and the vehicle. More specifically, an inductive coupling 610 is formed between the primary coils of the wireless charging assembly 110 and the secondary coils of the vehicle.

The wireless charging assembly 110 may transmit an alignment confirmation signal when the vehicle is satisfactorily aligned with the charging assembly 110. Thus, the vehicle may listen for (either actively or passively) the alignment confirmation signal from the wireless charging assembly, in order to indicate to the driver that the vehicle may be parked and a charging process may be initiated. The alignment confirmation signal may transmitted as a short, low power, magnetic activation of the wireless charger coil (e.g., a magnetic ping). The vehicle may indicate reception of the alignment confirmation signal via utilization of the wireless communications channel. Of course, after receiving the alignment confirmation signal, electricity may then be wirelessly received at the vehicle from the wireless charging assembly (i.e., the vehicle can be charged). Conversely, the wireless charging assembly 110 may detect the coupling of the secondary coils in the vehicle on its own.

Figure 7:
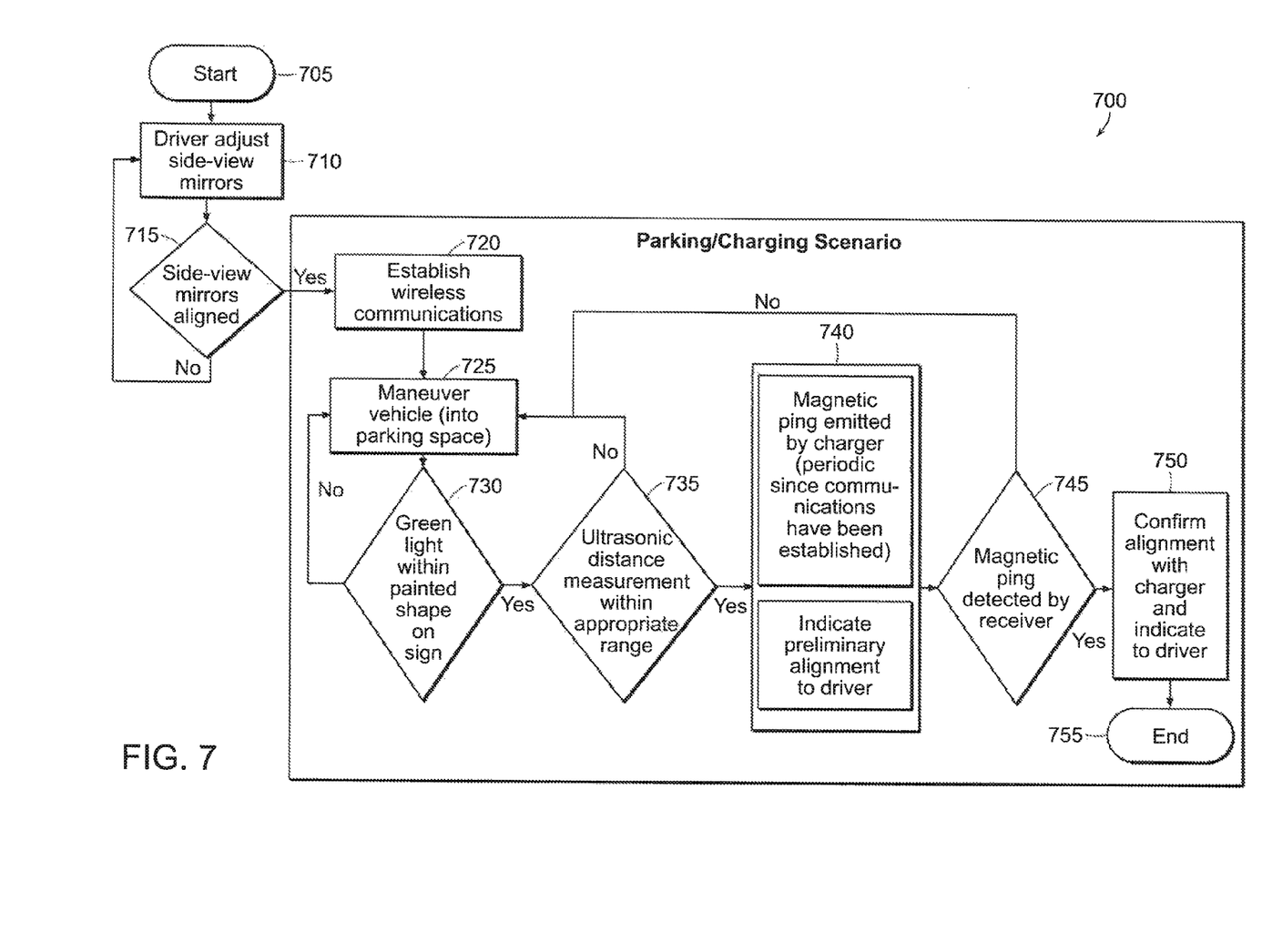
FIG. 7 illustrates an example simplified procedure for aligning a vehicle with a wireless charging assembly.

FIG. 7 illustrates an example simplified procedure for aligning a vehicle with a wireless charging assembly. The procedure 700 may start at step 705, and continue to step 710, where, as described in greater detail above, a vehicle can be aligned with a wireless charging assembly.

At step 710, the driver may adjust one or more mirrors 810 of the vehicle (e.g., side mirrors), and the adjustments may continue until the mirrors 810 are sufficiently aligned, at step 715. If the one or more mirrors 810 are sufficiently aligned, wireless communications may be established in the vehicle, at step 720. Then, at step 725, the vehicle may be maneuvered into the parking space 100.

Beginning at step 730, the alignment assisting process commences. At step 730, it is determined whether the projected image 135 appears within the target 125 on the reference object 120 (from the perspective of the driver). Then, at step 735, it is determined whether the ultrasonic measurements (e.g., based on the detected echoed signals 320b) are within a predetermined range.

If the projected image 135 appears within the target 125 on the reference object 120 (from the perspective of the driver), and the ultrasonic measurements (e.g., based on the detected echoed signals 320b) are within a predetermined range, the procedure 700 continues to step 740, where a magnetic ping is emitted by the wireless charging assembly 110. The magnetic pings may be periodic since communications have been established between the vehicle and charging assembly 110. As a result, a preliminary alignment status may be indicated to the driver. If it is determined that the magnetic ping(s) is determined by the vehicle at step 745, the vehicle may confirm alignment with the wireless charging assembly 110 and indicate to the driver that the vehicle is satisfactorily aligned with the charging assembly 110, at step 750. If not, the vehicle is not yet satisfactorily aligned with the wireless charging assembly 110, and thus, steps 725, 730, 735, 740 and 745 may be repeated (i.e., until proper alignment of the primary and secondary coils is achieved).

The procedure 700 illustratively ends at step 755. The techniques by which the steps of procedure 700 may be performed, as well as ancillary procedures and parameters, are described in detail above.

It should be noted that the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Accordingly, techniques are described herein that utilize geometric- and physics-based measurements in conjunction with signal-based measurements, along with magnetic confirmation, to determine wireless charging system alignment. The disclosed techniques require only minor and inexpensive modifications to a vehicle, as the HUD unit 130 for projecting the image 135 and the ultrasonic sensor device 310 are simple, low-cost components which can be readily applied to an EV or HEV.

While there have been shown and described illustrative embodiments that provide for aligning a vehicle with a wireless charging assembly, e.g., using a reference object, a HUD unit, an ultrasonic sensor, and a controller, it is to be understood that various other adaptations and modifications may be made within the spirit and scope of the embodiments herein. For example, the embodiments have been primarily shown and described herein with relation to ultrasonic sensors. However, the embodiments in their broader sense are not as limited, and may, in fact, be used with other types of sensors/transceivers. In addition, the embodiments have been primarily shown and described herein with relation to a reference object in the form of a sign-like object. However, the embodiments in their broader sense are not as limited, and the sign-like reference object is depicted herein for demonstration purposes only and should not be treated as limiting the disclosed embodiments.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    estimating a position of a driver's eyes in a vehicle during a parking event in a parking spot that includes a wireless charging assembly in which a primary coil is installed;
    projecting an image onto an interior surface of the vehicle at a location based on the estimated position of the driver's eyes to assist the driver in aligning the vehicle with the wireless charging assembly;
    transmitting signals from the vehicle toward a reference object located at a rear area of the parking spot and detecting echoed signals at the vehicle caused by the transmitted signals reflecting from a surface of the reference object;
    performing one or more calculations based on the detected echoed signals to determine an alignment state of the vehicle with respect to the wireless charging assembly; and
    listening for an alignment confirmation signal at the vehicle from the wireless charging assembly indicating that the vehicle is satisfactorily aligned with the wireless charging assembly,
    wherein the performing of the one or more calculations based on the detected echoed signals comprises:
        calculating one or more of an amplitude of the detected echoed signals and a voltage caused by the detected echoed signals;
        comparing the calculated amplitude to an amplitude of an echo with an angular offset of 0° with respect to the transmitted signals, or comparing the calculated voltage to a voltage caused by the echo with the angular offset of 0°; and
        determining whether the difference between the calculated amplitude and the amplitude of the echo with the angular offset of 0° or the difference between the calculated voltage and the voltage caused by the echo with the angular offset of 0° is within a predetermined range.

2. The method of claim 1, wherein the alignment state of the vehicle relates to an angle of a longitudinal axis of the vehicle with respect to a surface of the reference object.

3. The method of claim 1, further comprising:
    providing feedback to the driver indicating the alignment state of the vehicle.

4. The method of claim 3, wherein the feedback to the driver includes one or more of a sound and a visual indicator.

5. The method of claim 1, further comprising:
    projecting the image onto a windshield of the vehicle, so as to be located within a field of vision of the driver.

6. The method of claim 1, wherein the projected image is configured to be visually compatible with the reference object.

7. The method of claim 1, wherein the projected image is configured to be directionally aligned with the estimated position of the driver's eyes and a target disposed on the reference object.

8. The method of claim 1, further comprising:
    determining an angle of one or more mirrors of the vehicle; and
    estimating the position of the driver's eyes based on the determined angle of the one or more mirrors.

9. The method of claim 8, wherein the one or more mirrors includes a side mirror of the vehicle.

10. The method of claim 1, further comprising:
    receiving the alignment confirmation signal at the vehicle from the wireless charging assembly.

11. The method of claim 10, further comprising:
    utilizing a wireless communication channel of the vehicle in response to the received alignment confirmation signal.

12. The method of claim 10, further comprising:
    wirelessly receiving electricity at the vehicle from the wireless charging assembly after receiving the alignment confirmation signal.

13. The method of claim 1, wherein the alignment confirmation signal includes a magnetic ping transmitted by the wireless charging assembly.

14. The method of claim 1, further comprising:
    transmitting the signals from an ultrasonic sensor in the vehicle, wherein the signals are ultrasonic signals.

15. The method of claim 1, wherein the vehicle is an electric vehicle or a hybrid electric vehicle in which a secondary coil is installed, the secondary coil being capable of receiving a wireless charge from the primary coil of the wireless charging assembly.

16. The method of claim 1, wherein the reference object is a sign, and the surface of the reference object faces a front area of the parking spot.

17. A system comprising:
    a reference object located at a rear area of a parking spot;
    a heads-up display (HUD) in a vehicle that projects an image onto an interior surface of the vehicle at a location based on an estimated position of a driver's eyes to assist the driver in aligning the vehicle with a wireless charging assembly, in which a primary coil is installed, included in the parking spot during a parking event;
    an ultrasonic sensor in the vehicle that transmits ultrasonic signals toward the reference object and detects echoed signals at the vehicle caused by the transmitted signals reflecting from a surface of the reference object; and
    a controller in the vehicle configured to: i) estimate the position of the driver's eyes based on an angle of one or more mirrors of the vehicle, ii) perform one or more calculations based on the detected echoed signals to determine an alignment state of the vehicle with respect to the wireless charging assembly, and iii) detect an alignment confirmation signal from the wireless charging assembly indicating that the vehicle is satisfactorily aligned with the wireless charging assembly, wherein the performing of the one or more calculations based on the detected echoed signals comprises:

calculating one or more of an amplitude of the detected echoed signals and a voltage caused by the detected echoed signals;

comparing the calculated amplitude to an amplitude of an echo with an angular offset of 0° with respect to the transmitted signals, or comparing the calculated voltage to a voltage caused by the echo with the angular offset of 0°; and determining whether the difference between the calculated amplitude and the amplitude of the echo with the angular offset of 0° or the difference between the calculated voltage and the voltage caused by the echo with the angular offset of 0° is within a predetermined range.

18. A non-transitory computer readable medium containing program instructions for a system, which includes a reference object located at a rear area of a parking spot, a heads-up display (HUD) in a vehicle that projects an image onto an interior surface of the vehicle at a location based on an estimated position of a driver's eyes to assist the driver in aligning the vehicle with a wireless charging assembly, in which a primary coil is installed, included in the parking spot during a parking event, and an ultrasonic sensor in the vehicle that transmits ultrasonic signals toward the reference object and detects echoed signals at the vehicle caused by the transmitted signals reflecting from a surface of the reference object, the computer readable medium comprising:

program instructions that estimate the position of the driver's eyes based on an angle of one or more mirrors of the vehicle;

program instructions that perform one or more calculations based on the detected echoed signals to determine an alignment state of the vehicle with respect to the wireless charging assembly; and program instructions that detect an alignment confirmation signal from the wireless charging assembly indicating that the vehicle is satisfactorily aligned with the wireless charging assembly, wherein the performing of the one or more calculations based on the detected echoed signals comprises:

calculating one or more of an amplitude of the detected echoed signals and a voltage caused by the detected echoed signals;

comparing the calculated amplitude to an amplitude of an echo with an angular offset of 0° with respect to the transmitted signals, or comparing the calculated voltage to a voltage caused by the echo with the angular offset of 0°; and determining whether the difference between the calculated amplitude and the amplitude of the echo with the angular offset of 0° or the difference between the calculated voltage and the voltage caused by the echo with the angular offset of 0° is within a predetermined range.

* * * * *